(12) United States Patent
Nagino et al.

(10) Patent No.: US 7,746,275 B2
(45) Date of Patent: Jun. 29, 2010

(54) POSITION DETECTING SYSTEM AND POSITION DETECTING SERVER

(75) Inventors: Hideki Nagino, Fukuoka (JP); Yasuyuki Sajikawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 11/892,513

(22) Filed: Aug. 23, 2007

(65) Prior Publication Data

US 2007/0290855 A1 Dec. 20, 2007

Related U.S. Application Data

(63) Continuation of application No. PCT/JP2005/003528, filed on Mar. 2, 2005.

(51) Int. Cl.
*G01S 3/02* (2006.01)
*G08B 21/00* (2006.01)

(52) U.S. Cl. .................. 342/465; 342/450; 340/572.1; 340/686.1

(58) Field of Classification Search ................. 342/450, 342/453, 463–465; 340/539.13, 572.1, 686.1
See application file for complete search history.

(56) References Cited

U.S. PATENT DOCUMENTS

| 2003/0222820 | A1 | 12/2003 | Karr et al. |
| 2004/0260506 | A1 | 12/2004 | Jones et al. |
| 2007/0040545 | A1 | 2/2007 | Takiguchi |
| 2007/0268138 | A1* | 11/2007 | Chung et al. ............. 340/572.1 |

FOREIGN PATENT DOCUMENTS

| JP | 8-307917 | 11/1996 |
| JP | 9-200112 | 7/1997 |
| JP | 10-124781 | 5/1998 |
| JP | 11-169353 | 6/1999 |
| JP | 11-224400 | 8/1999 |
| JP | 2004-361276 | 12/2004 |
| JP | 2004361276 | 12/2004 |
| WO | WO 97/47148 | 12/1997 |
| WO | WO 99/30181 A1 | 6/1999 |
| WO | WO 01/97547 A1 | 12/2001 |

OTHER PUBLICATIONS

Supplementary European Search Report dated Sep. 5, 2008 issued in corresponding European Application No. 05719843.4-2220.
Partial English Translation of Office Action dated Sep. 8, 2009.

* cited by examiner

*Primary Examiner*—Dao L Phan
(74) *Attorney, Agent, or Firm*—Hanify & King, PC

(57) ABSTRACT

A position detecting system includes an RFID terminal configured to transmit an identification information signal by radio; a plurality of receiving devices configured to receive the identification information signal; and a position detecting server configured to receive a reception notification of the identification information signal from each of the receiving device and configured to estimate a position of the RFID terminal. The RFID terminal includes a part configured to perform radio transmission of a plurality of identification information signals having different radio strengths. The position detecting server includes a part configured to integrate the reception notifications of the identification information signals having different radio strengths and configured to estimate the position of the RFID terminal.

7 Claims, 17 Drawing Sheets

US 7,746,275 B2

POSITION DETECTING SYSTEM AND POSITION DETECTING SERVER

CROSS-REFERENCE TO RELATED APPLICATION

This application is a U.S. continuation application filed under 35 USC 111(a) claiming benefit under 35 USC 120 and 365(c) of PCT application JP05/003528, filed Mar. 2, 2005. The foregoing applications are hereby incorporated herein by reference.

BACKGROUND OF THE INVENTION

1. Field of the Invention

The present invention generally relates to position detecting systems and active RFID (Radio Frequency Identification) terminals. More particularly, the present invention relates to a position detecting system for position detecting by using an active RFID terminal and the RFID terminal.

2. Description of the Related Art

FIG. 1 is a structural view of an example of a related art position detecting system. As shown in FIG. 1, plural receivers 12a through 12j are fixed within a position detecting area 10. In addition, an active RFID terminal 14 moves in the position detecting area 10.

The active RFID terminal 14 sends a identification information signal by itself within a designate time interval. A reaching area (receivable area) of the identification information signal is shown by a circle 15. Because of this, the receivers 12a, 12b, 12c, and 12d situated in the circle 15 receive the identification information signal from the active RFID terminal 14.

When each of the receivers 12a through 12j receives the identification information signal, ID information demodulated from the identification information signal is sent to a server 16 via, for example, a LAN (Local Area Network).

When the server 16 receives the notification of the ID information from the receivers 12a, 12b, 12c, and 12d, which have received the identification information signal from the active RFID terminal 14, the server 16 calculates center of gravity 17 of positions of the receivers 12a, 12b, 12c, and 12d so as to estimate the center of gravity 17 as a present position of the active RFID terminal 14.

FIG. 2 is a block diagram of the RFID terminal 14 shown in FIG. 1. As show in FIG. 2, the ID information for identifying the RFID terminal is stored in an ID-ROM part 20. A transmission control part 21 codes the ID information read from the ID-ROM part 20 and supplies coded ID information to the RF part 22 with a designated time interval. The RF part 22 modulates the coded ID information and transmits it as an identification information signal of a specific frequency from an antenna 23.

FIG. 3 is a structural view of another example of the related art position detecting system. In FIG. 3, parts that are the same as the parts shown in FIG. 1 are given the same reference numerals, and explanation thereof is omitted.

As shown in FIG. 3, when a server 18 receives the ID information from the receivers 12a, 12b, 12c, and 12d receiving the identification information signal from the active RFID terminal 14, the server 18 weights each of positions of the receivers 12a, 12b, 12c, and 12d by using larger weights as the number of identification information signals received by the receivers 12a, 12b, 12c, and 12d is larger. Then the server 18 calculates the center of gravity 19 so as to estimate the center of gravity 19 as a present position of the active RFID terminal 14.

Here, the number of receptions of the identification information signals by the receiver 12c near the active RFID terminal 14 is large. The number of receiving the identification information signal by the receiver 12a far from the active RFID terminal 14 is small. The present position of the active RFID terminal 14 is estimated by being biased to a side of the receiver 12c where the number of received signal is large by weighting the number of received signals so that the position estimation precision of the active RFID terminal 14 is improved.

Patent Publication 1 mentioned below describes that an electric wave transmitted from the RFID is received by plural receivers so that the position of the RFID is specified by positions of the plural receivers.

Patent Publication 2 mentioned below describes that an electric wave transmitted from the portable terminal is received by plural receivers so that the position of the portable terminal is specified based on each of received levels at which plural receivers receive.

Patent Publication 3 mentioned below describes that an electric wave transmitted from the RFID is received by plural receivers and a position corresponding to the receiver closest to the RFID is specified as the position of the RFID based on the received radio strength of plural receivers.

Patent Publication 4 mentioned below describes that an electric wave transmitted from the portable terminal is received by plural local control stations and the position of the portable terminal is specified by position of the local control station or received radio strength.

[Patent Document 1] Japanese Laid-Open Patent Application Publication No. 10-124781
[Patent Document 2] Japanese Laid-Open Patent Application Publication No. 8-307917
[Patent Document 3] Japanese Laid-Open Patent Application Publication No. 11-224400
[Patent Document 4] Japanese Laid-Open Patent Application Publication No. 11-169353

However, in the above-discussed related art cases, the position of the RFID is specified based on the position of the receiver which receives the identification information signal or by weighting the number of receptions of the identification information signal to the position of the receiver. Therefore, there is limitation of precision for specifying the position of the RFID. In addition, in an area where the electric wave reaches, depending on the difference of frequency of the electric wave or reflection, there may be a position where the electric wave is not easily received by the receiver. This may cause degradation of precision for specifying the position of the RFID.

SUMMARY OF THE INVENTION

Accordingly, embodiments of the present invention may provide a novel and useful position detecting system and RFID terminal solving one or more of the problems discussed above.

More specifically, the embodiments of the present invention may provide a position detecting system whereby position specifying accuracy can be improved and a RFID terminal.

One aspect of the present invention may be to provide a position detecting system, including an RFID terminal configured to transmit an identification information signal by radio; a plurality of receiving devices configured to receive the identification information signal; and a position detecting server configured to receive a reception notification of the identification information signal from each of the receiving device and configured to estimate a position of the RFID terminal; wherein the RFID terminal includes a part configured to perform radio transmission of a plurality of identification information signals having different radio strengths; and the position detecting server includes a part configured to integrate the reception notifications of the identification information signals having different radio strengths and configured to estimate the position of the RFID terminal.

Another aspect of the present invention may be to provide a position detecting system, including: an RFID terminal configured to transmit an identification information signal by radio; a plurality of receiving devices configured to receive the identification information signal; and a position detecting server configured to receive a reception notification of the identification information signal from each of the receiving device and configured to estimate a position of the RFID terminal; wherein the RFID terminal includes a part configured to perform radio transmission of a plurality of identification information signals having different radio frequencies; and the position detecting server includes a part configured to integrate the reception notifications of the identification information signals having different radio frequencies and configured to estimate the position of the RFID terminal.

Other aspect of the present invention may be to provide an RFID terminal of a position detecting system, in which the position detecting system an identification information signal transferred by radio from the RFID terminal is received by a plurality of receivers, and reception notification of the identification information signal from each of the receivers is received by a position detecting server, so that a position of the RFID terminal is estimated, the RFID terminal including a part configured to perform radio transmission of a plurality of the identification information signals having different radio strengths.

Other aspect of the present invention may be to provide an RFID terminal of a position detecting system, in which position detecting system an identification information signal transferred by radio from the RFID terminal is received by a plurality of receivers, and reception notification of the identification information signal from each of the receivers is received by a position detecting server, so that a position of the RFID terminal is estimated, the RFID terminal including a part configured to perform radio transmission of a plurality of the identification information signals having different radio frequencies.

Other aspect of the present invention may be to provide a position detecting system, including an RFID terminal configured to transmit an identification information signal by radio; a plurality of receiving devices configured to receive the identification information signal; and a position detecting server configured to receive a reception notification of the identification information signal from each of the receiving devices and configured to estimate the position of the RFID terminal; wherein the RFID terminal includes a part configured to perform radio transmission of a plurality of the identification information signals having different radio strengths and frequencies; and the position detecting server includes a part configured to integrate the reception notifications of the identification information signals having different radio frequencies and radio strengths and configured to estimate the position of the RFID terminal.

DETAILED DESCRIPTION OF THE PREFERRED EMBODIMENT

A description will now be given, with reference to FIG. 1 through FIG. 14, of embodiments of the present invention.

A description will be given briefly below, with reference to FIG. 4 through FIG. 17.

First Embodiment of the Present Invention

Figure 1:
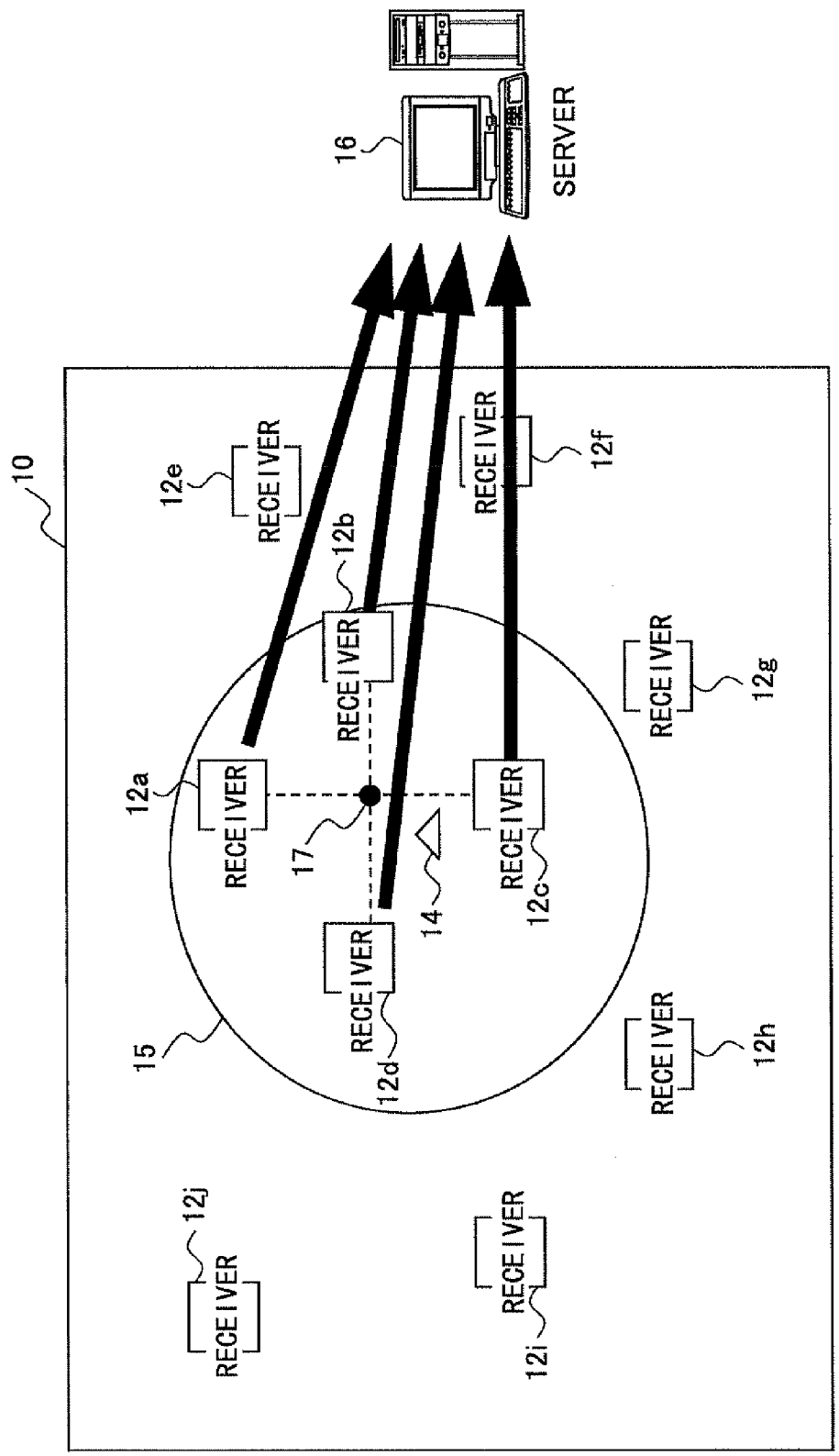
FIG. 1 is a structural view of an example of a related art position detecting system.
Figure 2:
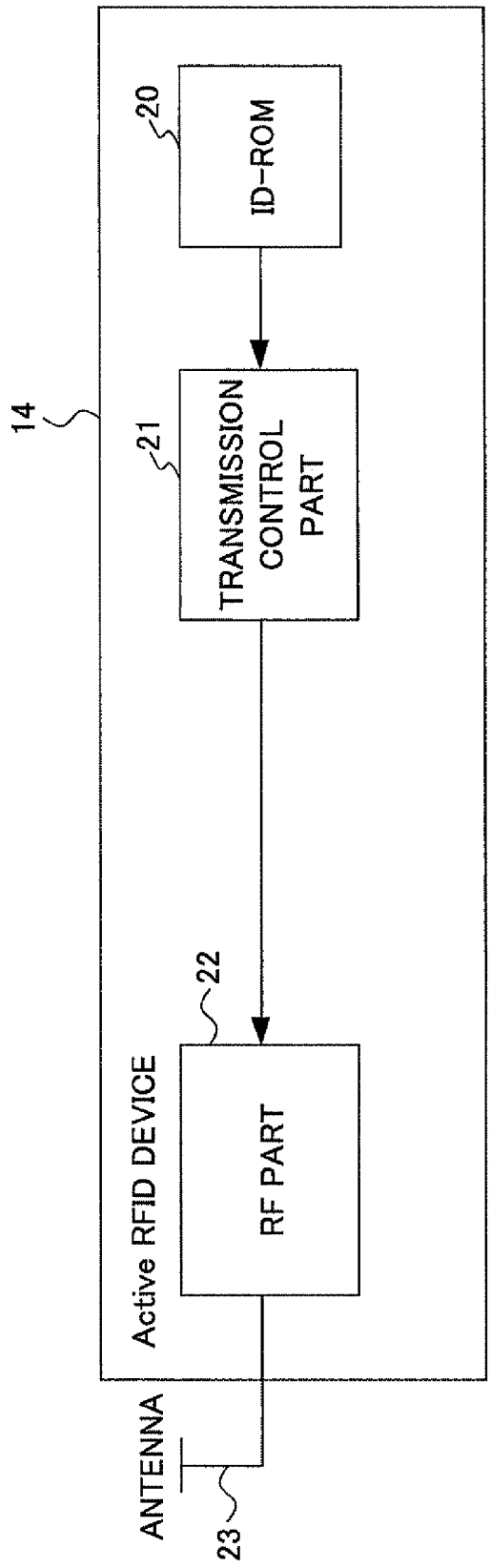
FIG. 2 is a block diagram of a RFID terminal 14 shown in FIG. 1.
Figure 3:
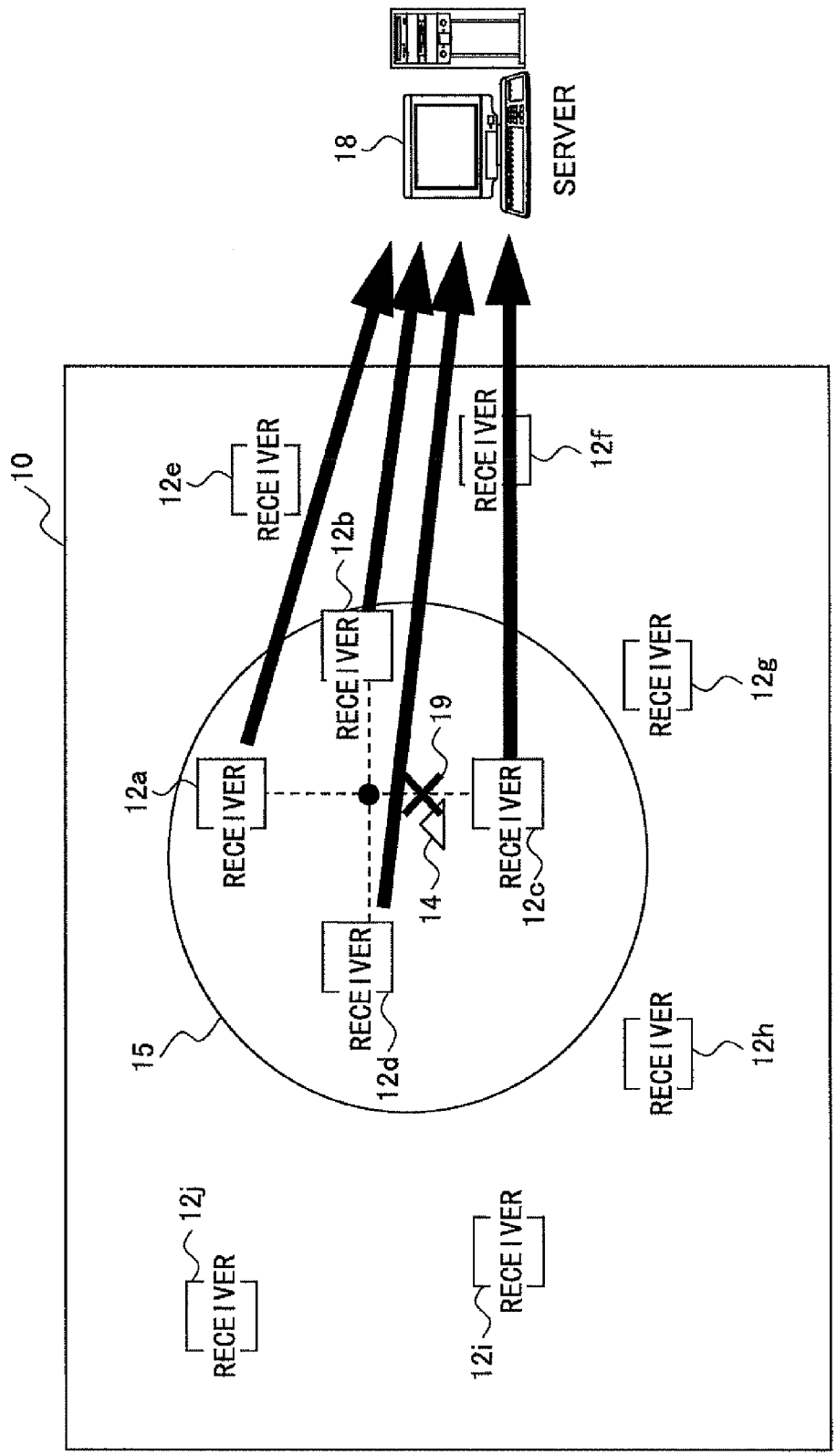
FIG. 3 is a structural view of another example of the related art position detecting system.
Figure 4:
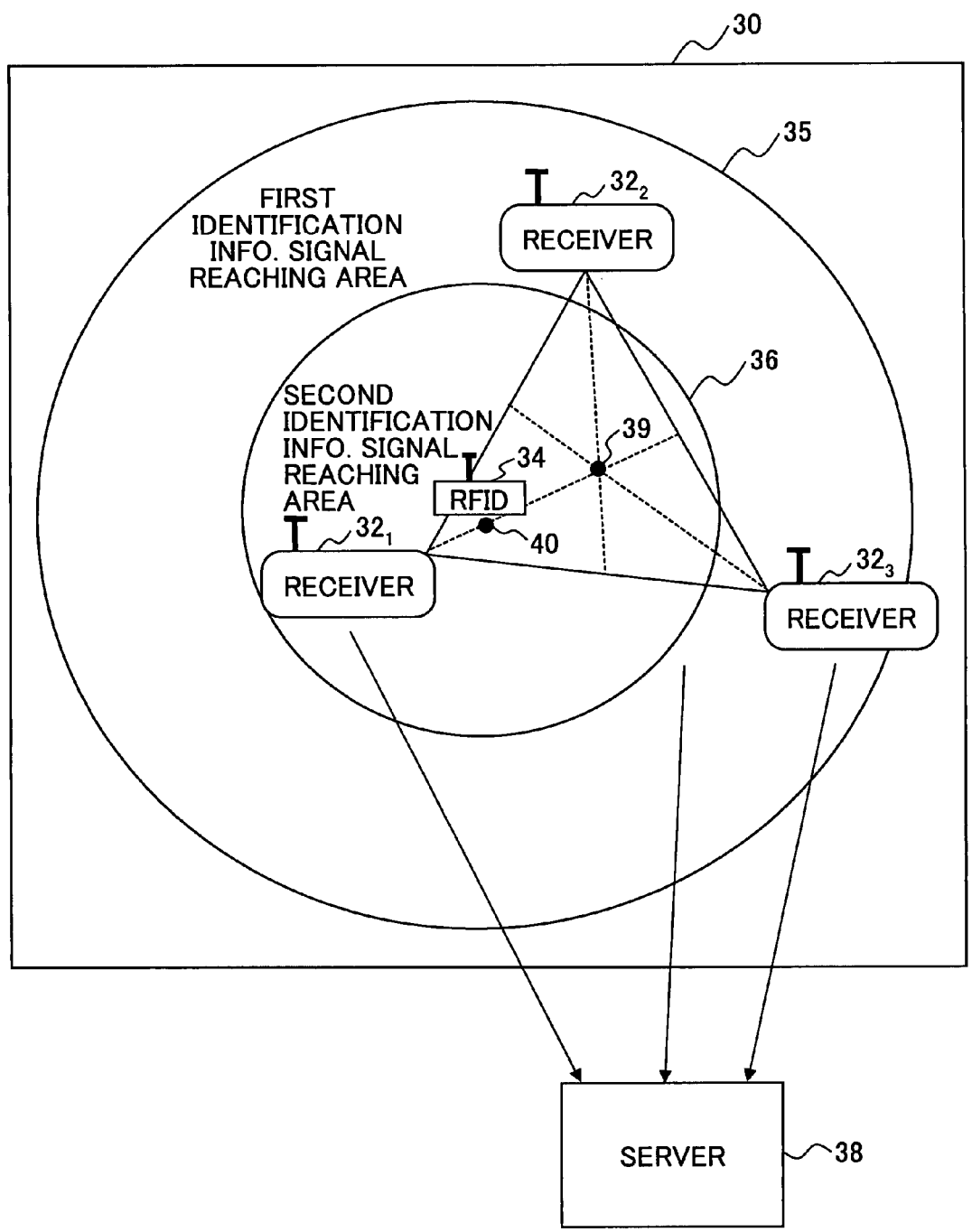
FIG. 4 is a structural view of a position detecting system of a first embodiment of the present invention.

FIG. 4 is a structural view of a position detecting system of a first embodiment of the present invention. As shown in FIG. 4, plural receivers $32_1$ through $32_3$ are fixed within a position detecting area 30. In addition, an active RFID terminal 34 moves in the position detecting area 30.

The active RFID terminal 34 transmits identification information signals with plural kinds (for example, two kinds) of radio strength at a designated time interval. Reaching areas (receivable areas) of a first identification information signal having a high radio strength and a second identification information signal having a low radio strength are shown by circles 35 and 36. The receivers $32_1$ through $32_3$ situated in the circle 35 receive the first identification information signal having high radio strength from the active RFID terminal 34. Only the receiver $32_1$ situated in the circle 36 receives the second identification information signal having low radio strength. When each of the receivers $32_1$ through $32_3$ receives the first identification information signal or the second identification information signal, ID information demodulated from the first identification information signal or the second identification information signal is reported to the position detecting server 38 via, for example, a LAN (Local Area Network).

Figure 5:
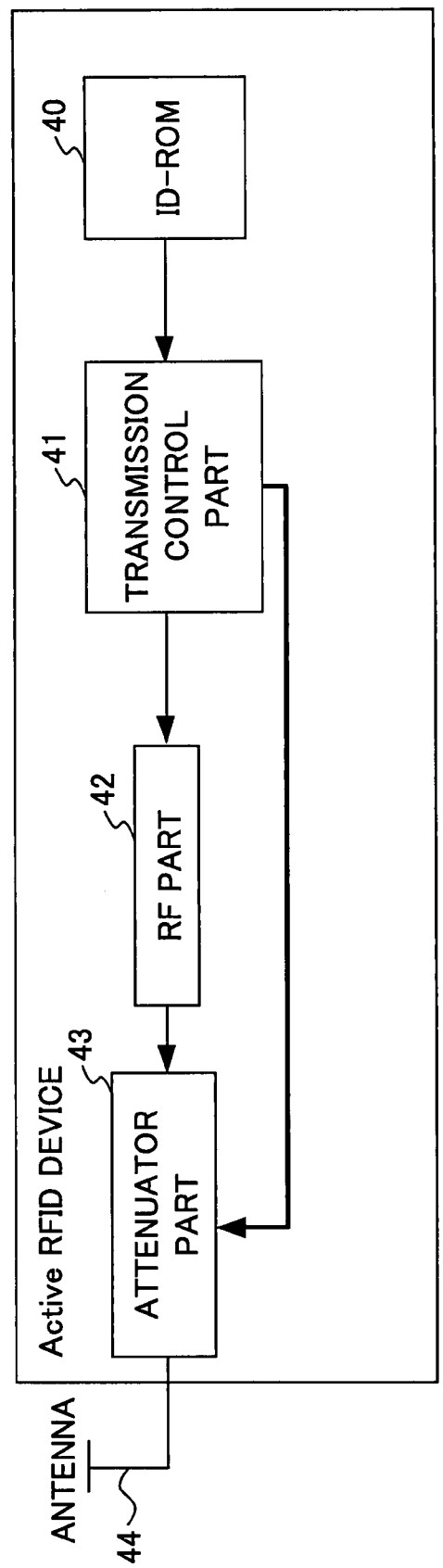
FIG. 5 is a block diagram of an active RFID terminal 34 shown in FIG. 4.

FIG. 5 is a block diagram of the active RFID terminal 34 shown in FIG. 4. As shown in FIG. 5, the ID information for identifying the RFID terminal is stored in an ID-ROM part 40. A transmission control part 41 codes the ID information read from the ID-ROM part 40 and supplies the coded ID information to the RF part 42 with a designated time interval.

The RF part 42 modulates the coded ID information and transmits it as an identification information signal of a specific frequency to an attenuator part 43. The attenuator part 43 switches attenuation to the identification information signal by control of the transmission control part 41 so that the first identification information signal having no attenuation and the second identification information having 50% attenuation are mutually supplied to a non-directional antenna 44 so that ration transmission is made.

Figure 6:
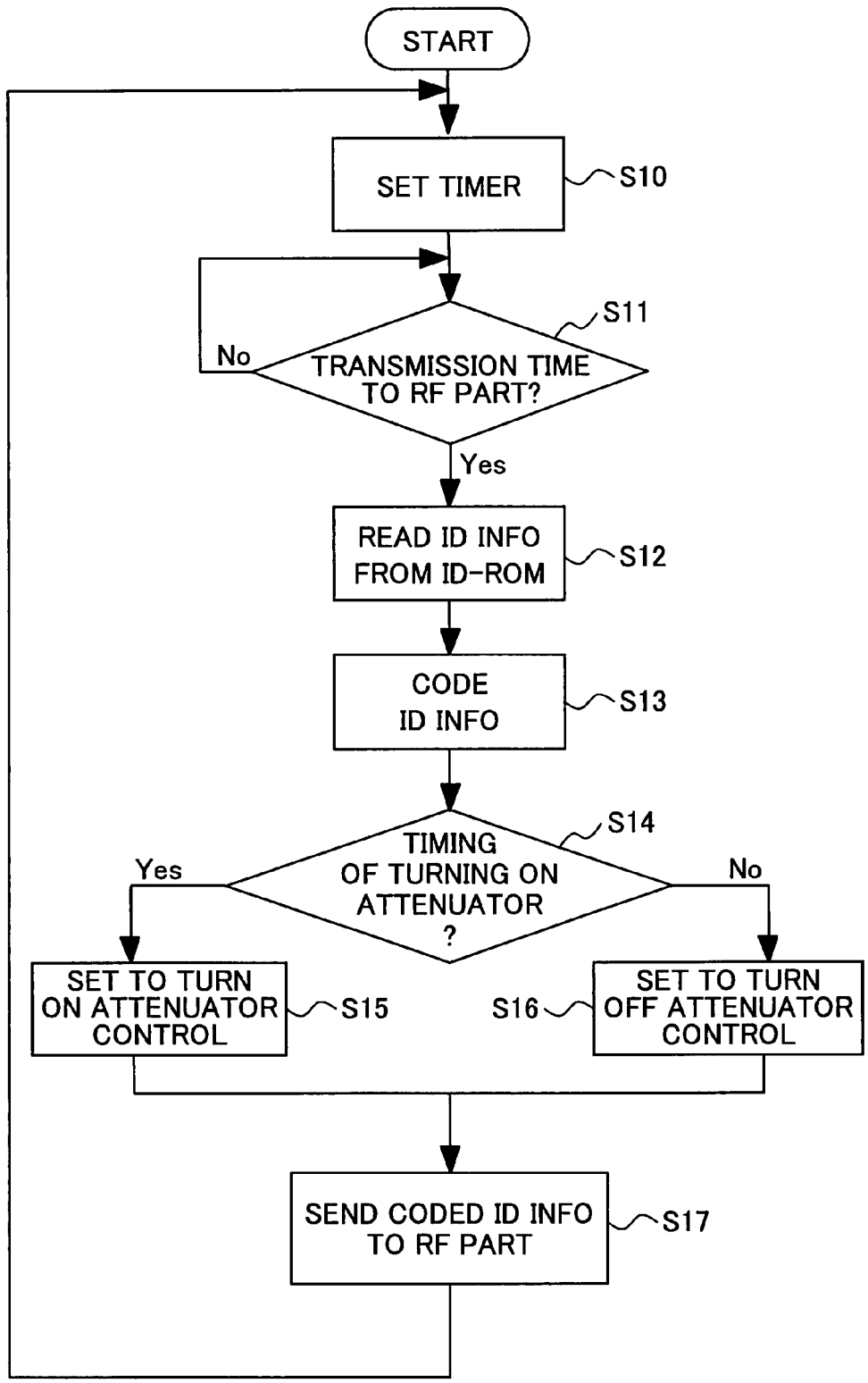
FIG. 6 is a flowchart of a control process executed by a transmission control part 41.

FIG. 6 is a flowchart of a control process executed by a transmission control part 41. As shown in FIG. 6, a timer is set in step S10. Whether time indicated by the timer is a transmission time to the RF part 42 is determined in step S1. When the time becomes the transmission time, the ID information is read from the ID-ROM part 40 in step S12 and the ID information is coded in step S13.

Next, whether it is time for turning on the attenuator part 43, namely second identification information signal output timing, is determined in step S14. In a case where it is the time for turning on the attenuator part 43, the attenuator part 43 is turned on in step S15. In a case where it is not the time for turning on the attenuator part 43, the attenuator part 43 is turned off in step S16. Next, the coded ID information is supplied to the RF part 42 in step S17 so that the identification information signal of the specific frequency modulated by the RF part 42 is transmitted.

Figure 7:
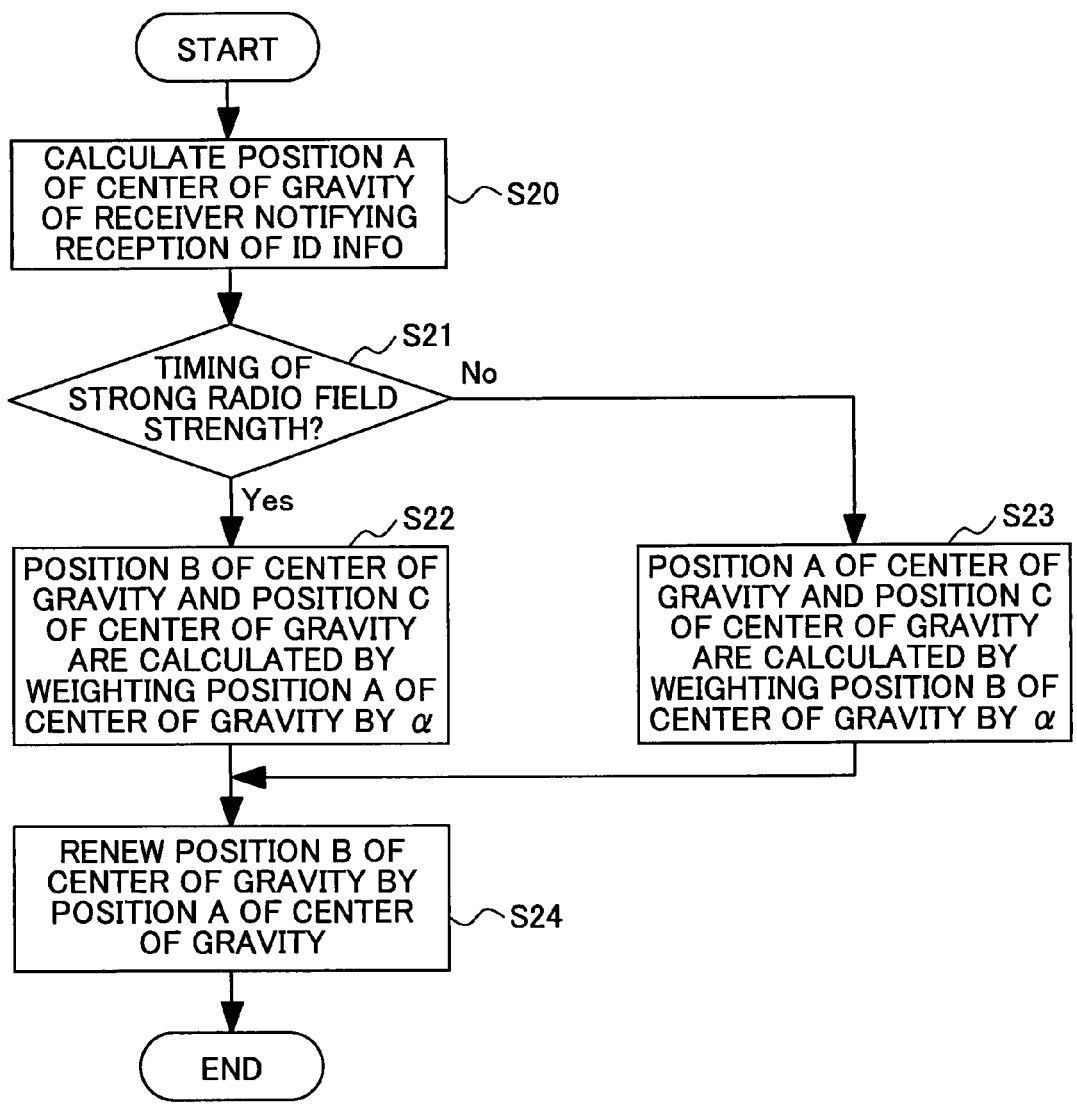
FIG. 7 is a flowchart of a position specifying process executed by a position detecting server 38.

FIG. 7 is a flowchart of a position specifying process executed by a position detecting server 38. As shown in FIG. 7, notification of the ID information is received from a single or plural receivers situated in the position detecting area 30 in step S20 so that a center A of gravity of positions of the receivers receiving the notification is calculated.

Next, whether a process timing of this time is a time for outputting the first identification information signal of the active RFID terminal 34 is determined in step S21. If the number of receivers reporting the same ID information at the process timing of this time is greater than the number of receivers reporting the same ID information at the process timing of last time, it is determined that it is the time for outputting the first identification information signal of the active RFID terminal 34.

In a case where the process timing of this time is the time for outputting the first identification information signal, in step S22, a weighting factor α is applied to the center of gravity A of this time so that the center of gravity B and the center of gravity C of last time are calculated. This center of gravity C is estimated as the present position of the active RFID terminal 34.

On the other hand, in a case where the process timing of this time is not the time for outputting the first identification information signal, in step S23, a weighting factor α is multiplied to the center of gravity B of last time so that the center of gravity A of this time and the center of gravity C of last time are calculated. This center of gravity C is estimated as the present position of the active RFID terminal 34.

After this, in step S24, the center of gravity A is renewed by holding the center of gravity A as the center of gravity B of last time so that this process is ended.

Here, the weighting factor α is calculated by dividing the radius of the circle where the first identification information signal reaches with the radius of the circle where the second identification information signal reaches.

As shown in FIG. 4, the identification information signals with high radio strength from the active RFID terminal 34 are received by the receivers $32_1$ through $32_3$ situated in the circle 35 so that the position 39 of the center of gravity is calculated. In addition, the identification information signal with low radio strength from the active RFID terminal 34 is received by only the receiver $32_1$ situated in the circle 36 so that the position of the center of gravity is the position of the receiver $32_1$. In this case, the position 39 of the center of gravity and the position 40 of center of gravity where the position of the receiver $32_1$ is weighted are estimated as the present position of the RFID terminal 34 so that position specifying accuracy can be improved.

Figure 8:
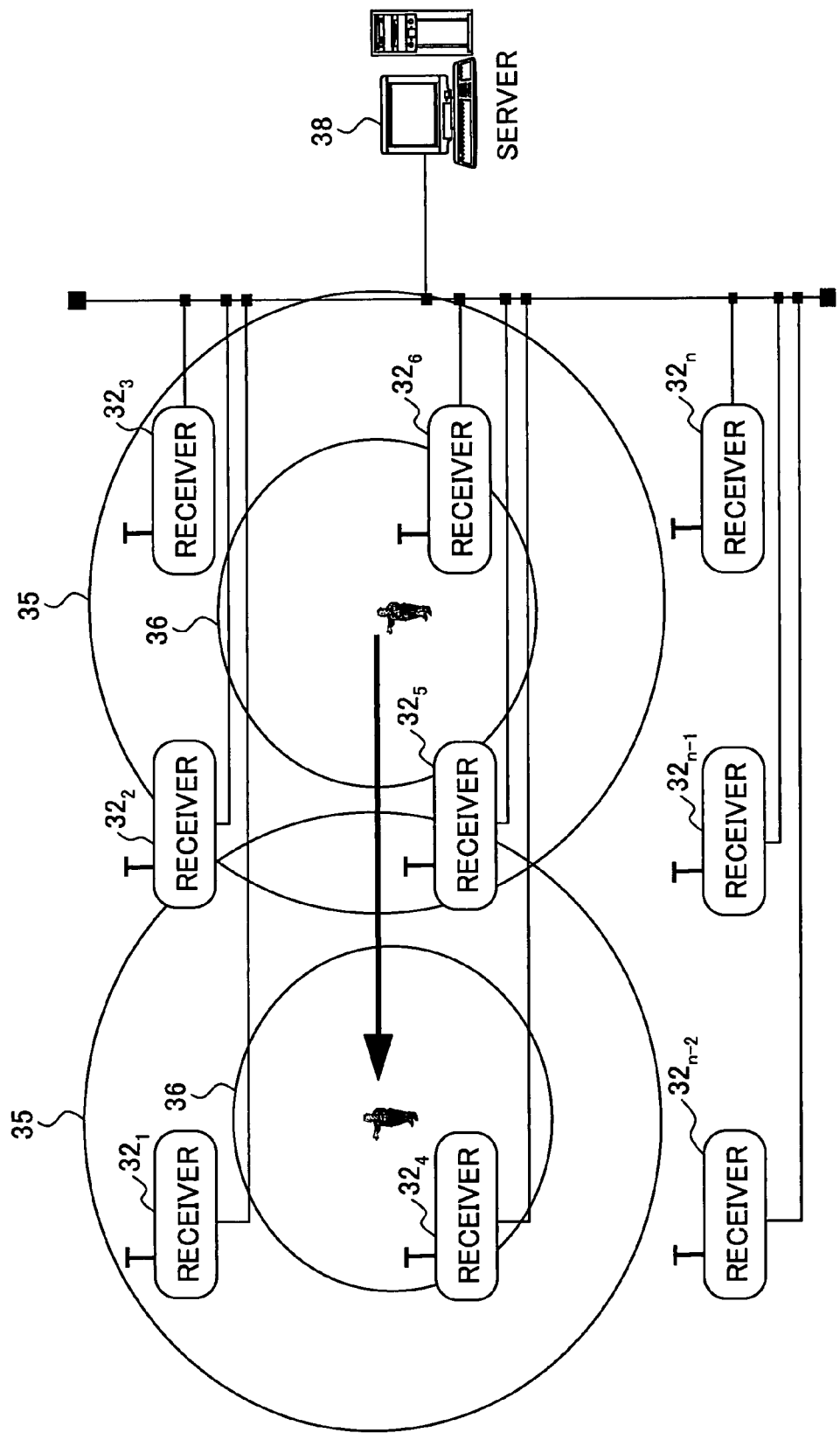
FIG. 8 is a view for explaining the first embodiment of the present invention.

FIG. 8 is a view for explaining the first embodiment of the present invention. A case shown in FIG. 8 where plural receivers $32_1$ through $32_n$ are situated in a certain area and a person holding the active RFID terminal 34 moves from the position of the receiver $32_6$ to the position of the receiver $32_4$ is discussed.

Figure 9:
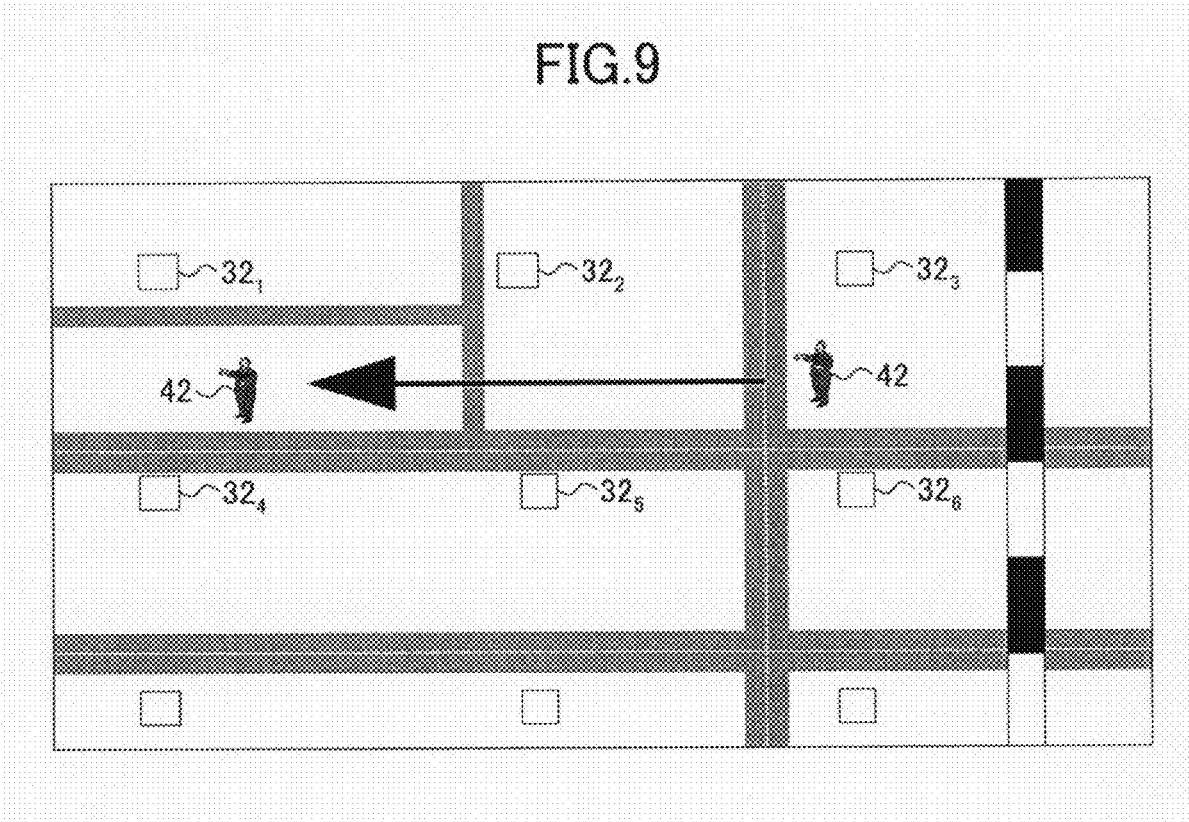
FIG. 9 is a view showing a display screen of the position detecting server 38.

(1) In the vicinity of the receiver $32_6$, the first identification information signal with high radio strength from the active RFID terminal 34 is received by the receivers $32_2$, $32_3$, $32_5$, and $32_6$ and the second identification information signal with low radio strength is received by the receivers $32_6$. Because of this, as shown in FIG. 9, a person 42 holding the RFID terminal 34 is displayed near the receiver $32_6$ on the display screen of the position detecting server 38. Here, FIG. 9 is a view showing a display screen of the position detecting server 38.

(2) Next, if the person holding the RFID terminal 34 moves to a side of the receivers $32_5$, the first identification information signal is received by the receivers $32_2$ and $32_5$, and $32_6$ and the second identification information signal is received by only the receivers $32_5$. Because of this, the person 42 holding the RFID terminal 34 is displayed near the receiver $32_5$ on the display screen of the position detecting server 38.

(3) As the person holding the RFID terminal 34 moves, the receiver receiving the identification information signal moves. Finally, the first identification information signal is received by the receivers $32_1$, $32_4$, and $32_5$, and the second identification information signal is received by only the receivers $32_4$. Because of this, the person 42 holding the RFID terminal 34 is displayed near the receiver $32_4$ on the display screen of the position detecting server 38.

Thus, it is possible to implement position detecting with high precision so that movement of the person 42 holding the RFID terminal 34 is displayed near the receiver $32_4$ on the display screen of the position detecting server 38, smoothly and accurately.

Second Embodiment of the Present Invention

Figure 10:
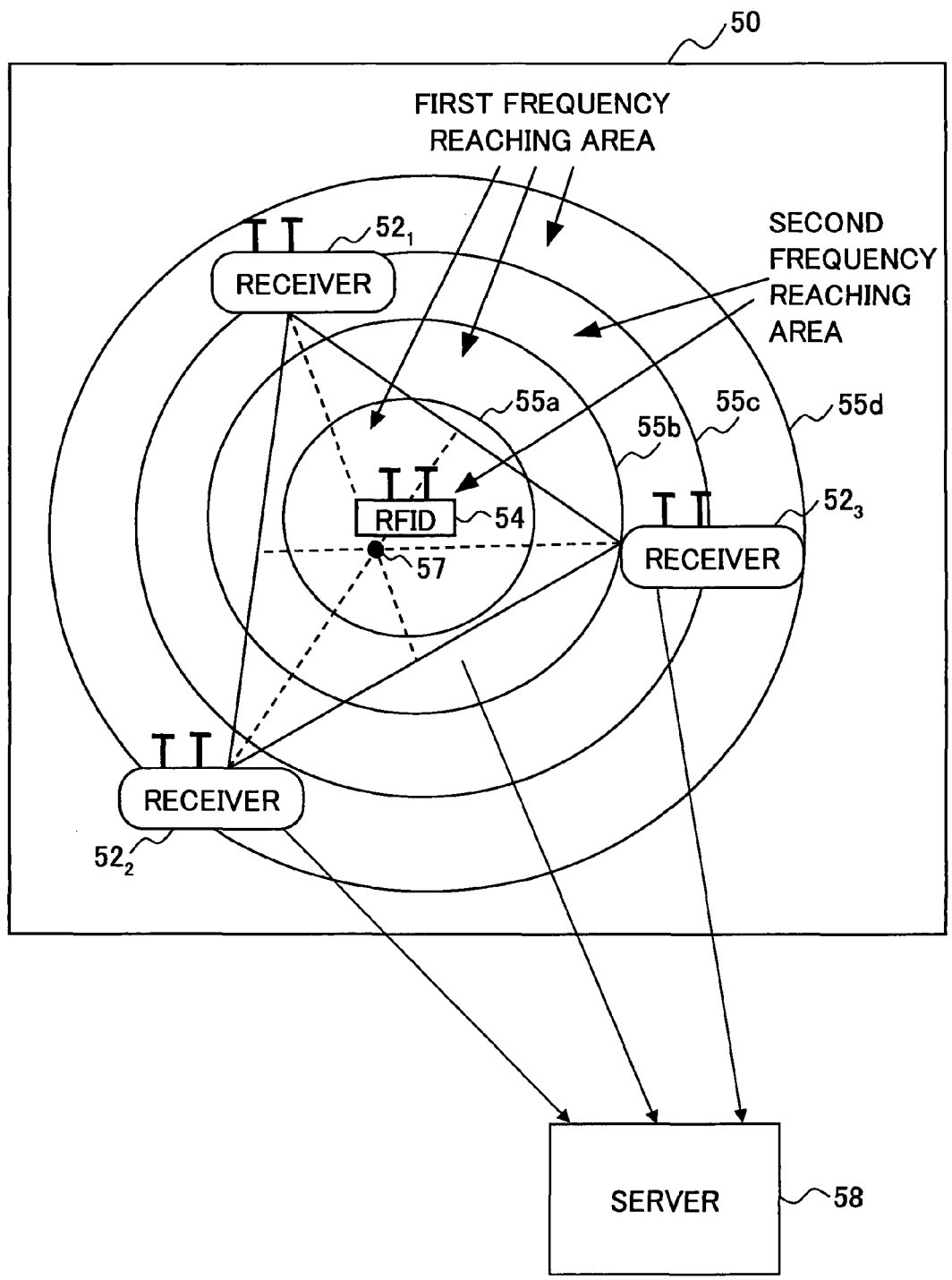
FIG. 10 is a structural view of a position detecting system of a second embodiment of the present invention.

FIG. 10 is a structural view of a position detecting system of a second embodiment of the present invention. As shown in FIG. 10, plural receivers $52_1$ through $52_3$ are fixed within a position detecting area 50. In addition, an active RFID terminal 54 moves in the position detecting area 50.

The active RFID terminal 54 transmits identification information signal with plural kinds (for example, two kinds) of frequencies at a designated time interval. Reaching areas (receivable areas) of a identification information signal of a first frequency (for example, several hundreds MHz) are, for example, inside a circle 55a, areas of a circle 55a and a circle 55b, and areas of a circle 55c and a circle 55d. Reaching areas (receivable areas) of a identification information signal of a second frequency (for example, several GHz) are, for example, inside a circle 55a, and areas of a circle 55b and a circle 55c.

The receivers $52_1$ and $52_2$ situated in the circles 55c and 55d receive the first identification information signal having the first frequency from the active RFID terminal 34. Only the receiver $52_3$ situated in the circles 55b and 55c receives the identification information signal having a second frequency from the active RFID terminal 34.

When each of the receivers $52_1$ through $52_3$ receives the identification information signal, ID information demodulated from the identification information signal is reported to the position detecting server 58 via, for example, a LAN (Local Area Network).

Figure 11:
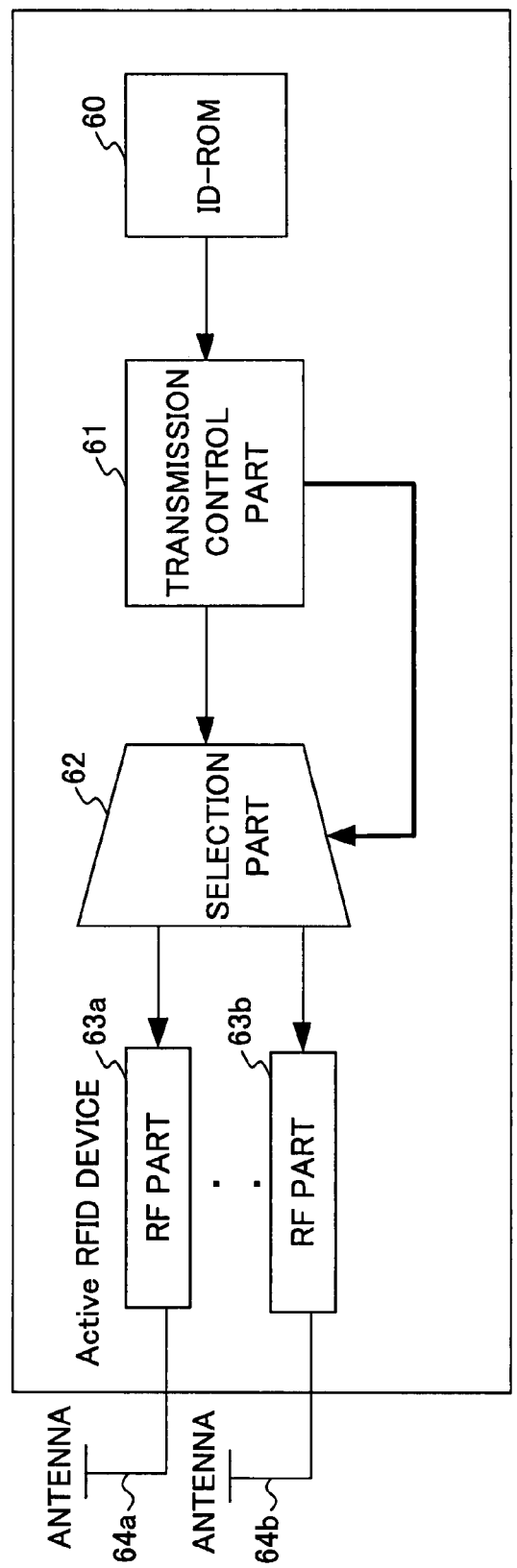
FIG. 11 is a block diagram of an active RFID terminal 54 shown in FIG. 10.

FIG. 11 is a block diagram of the active RFID terminal 54 shown in FIG. 10. As shown in FIG. 10, the ID information for identifying the RFID terminal is stored in an ID-ROM part 60. A transmission control part 61 encodes the ID information read from the ID-ROM part 60 and supplies the coded ID information to the RF part 42 with a designated time interval. A selection part 62 mutually switches the RF part 63a or the RF part 63b as a part where the identification information signal should be supplied, by control of the transmission control part 61.

The RF part 63a modulates the coded ID information supplied from the selection part 62 and transmits it by radio as an identification information signal of a first frequency from non-directional antenna 64a. The RF part 63b modulates the coded ID information supplied from the selection part 62 and transmits it by radio as an identification information signal of a first frequency from non-directional antenna 64b.

In a case where the RF parts 63a and 63b under a structure shown in FIG. 11 output first and second identification information signal having different radio strength at the same specific frequency, this can be applied to the first embodiment of the present invention.

Figure 12:
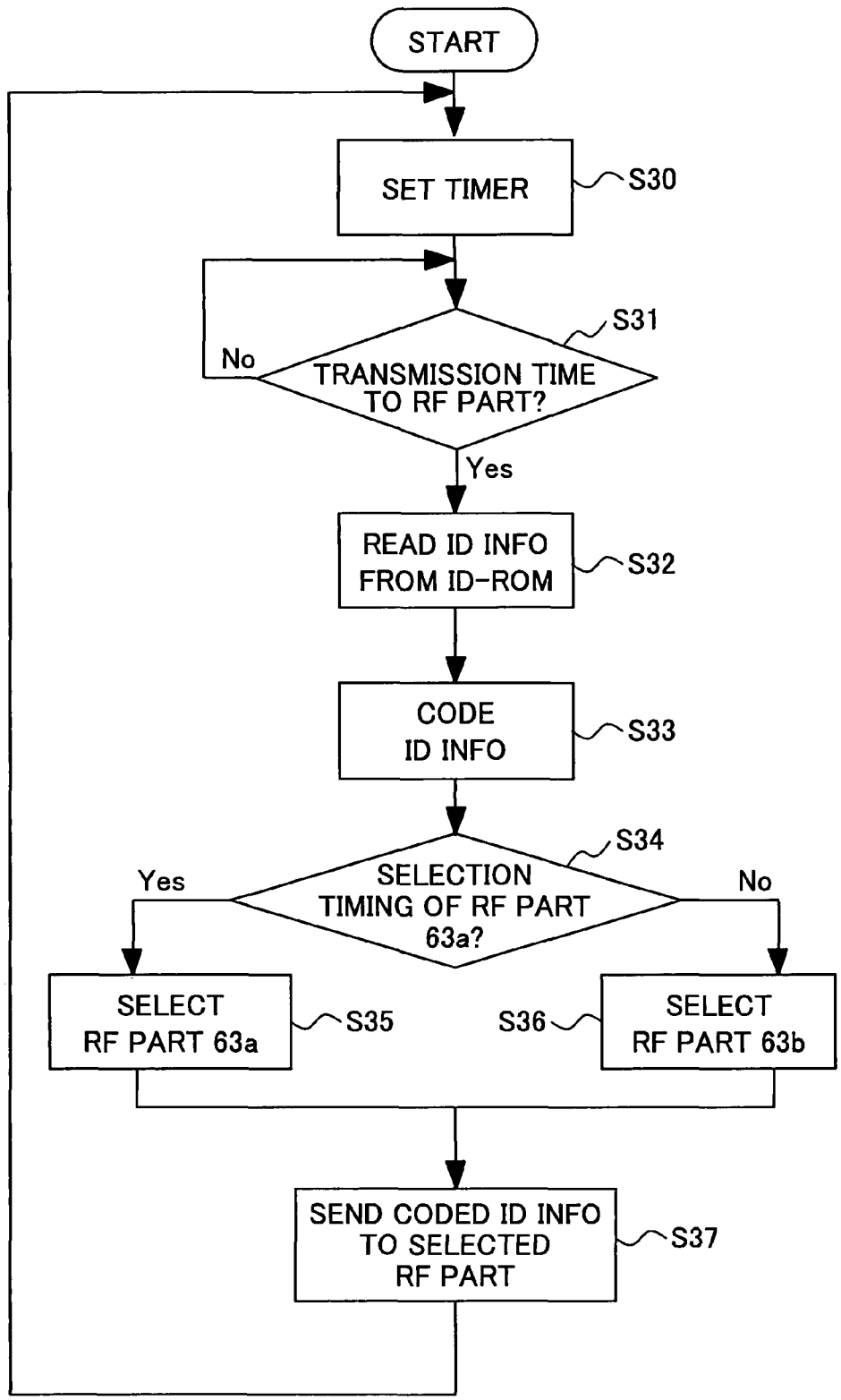
FIG. 12 is a flowchart of a control process executed by a transmission control part 61.

FIG. 12 is a flowchart of a control process executed by the transmission control part 61. As shown in FIG. 12, a timer is set in step S30. Whether time indicated by the timer is a transmission time to the RF part 62 is determined in step S31. When the time becomes the transmission time, the ID information is read from the ID-ROM part 60 in step S32 and the ID information is encoded in step S33.

Next, whether it is time for selecting the RF part 63a is determined in step S34. In a case where it is the time for selecting the RF part 63a, the part to be supplied the identification information signal is set in the selection part 62 in step S35. In a case where it is not the time for selecting the RF part 63b, the part to be supplied the identification information signal is set in the selection part 62 in step S36. Next, the ID information is supplied to the RF part 63a or the RF part 63b selected by the selection part 62 in step S37 so that the identification information signal of the specific frequency modulated by the RF part 42 is transmitted.

Figure 13:
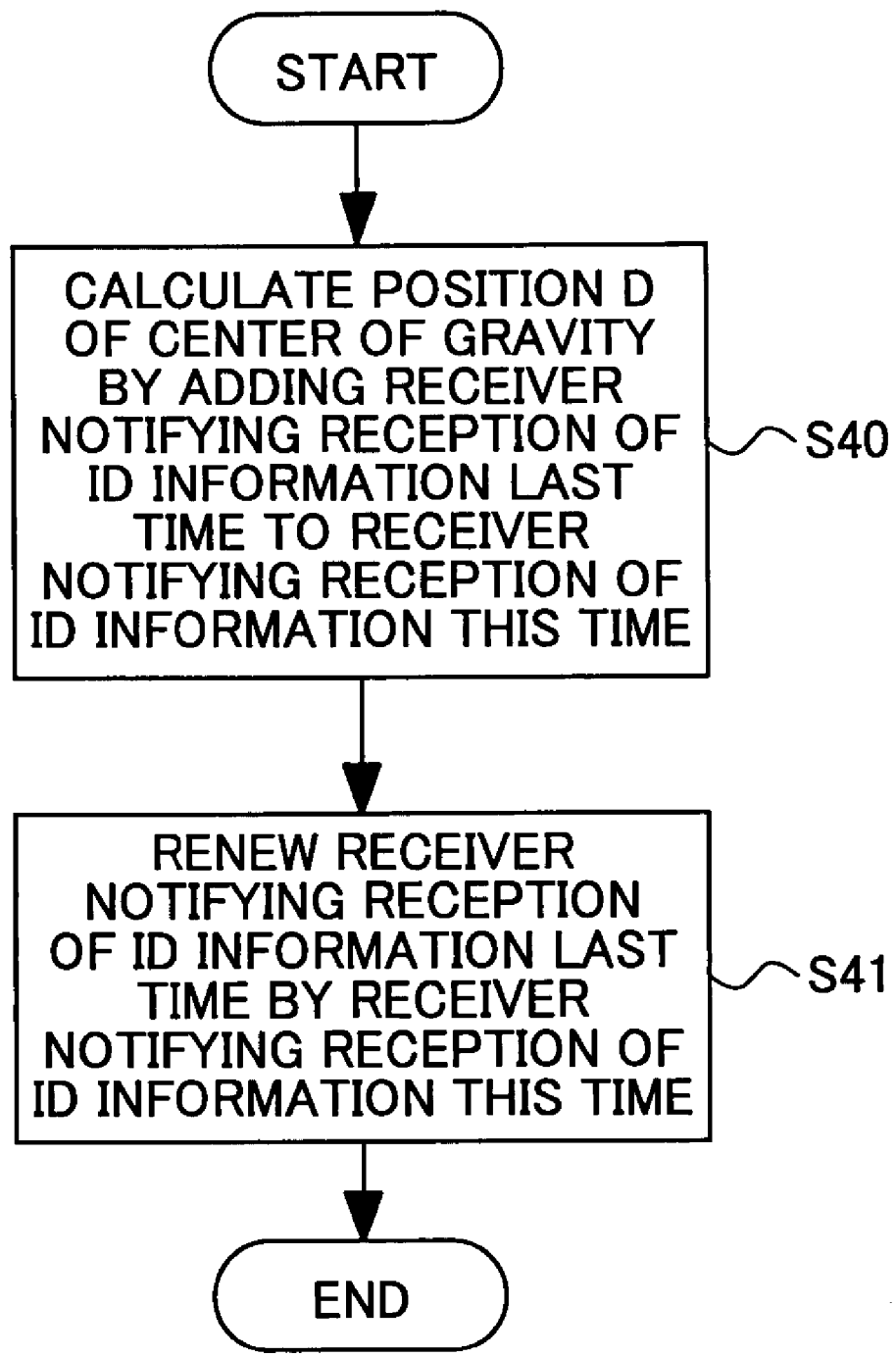
FIG. 13 is a flowchart of a position specifying process executed by a position detecting server 58.

FIG. 13 is a flowchart of a position specifying process executed by a position detecting server 58. The notification of the ID information is received from one or more receivers in the position detection area 50 in step S40 and the receiver notifying reception of the ID information receiving of the last time is added to the receiver notifying reception of the ID information receiving of this time. After that, as the number of receptions of the identification information signal of each of the receivers compared to the same ID information becomes larger, the larger weight is used for weighting the position of the corresponding receivers so that the position D of the center of gravity is calculated. This position D of the center of gravity is estimated as the present position of the active RFID terminal 34.

As shown in FIG. 7, notification of the ID information is received from a single or plural receivers situated in the position detecting area 30 in step S20 so that a center of gravity A of a position of each of the receivers receiving the notification is determined.

Next, in step S41, renewal is made by holding the receiver of the ID information receiving notification of this time as the receiver of the ID information receiving notification of the last time so that this process is ended.

As shown in FIG. 10, the identification information signal at a timing of the first frequency is transmitted from the active RFID terminal 54 by the receivers $52_1$ and $52_2$ situated in the area of the circle 55c and circle 55d, and the identification information signal at a timing of the second frequency is transmitted from the active RFID terminal 54 by the receiver $52_3$ situated in the area of the circle 55b and circle 55c.

In this embodiment, the information reception notification of the receivers $52_1$ and $52_2$ and the ID information reception notification of the receiver $52_3$ are integrated so that the position 57 of the center of gravity obtained from the receivers $52_1$, $52_2$ and $52_3$ is estimated as the present position of the active RFID 54 and position specifying accuracy can be improved.

Figure 14:
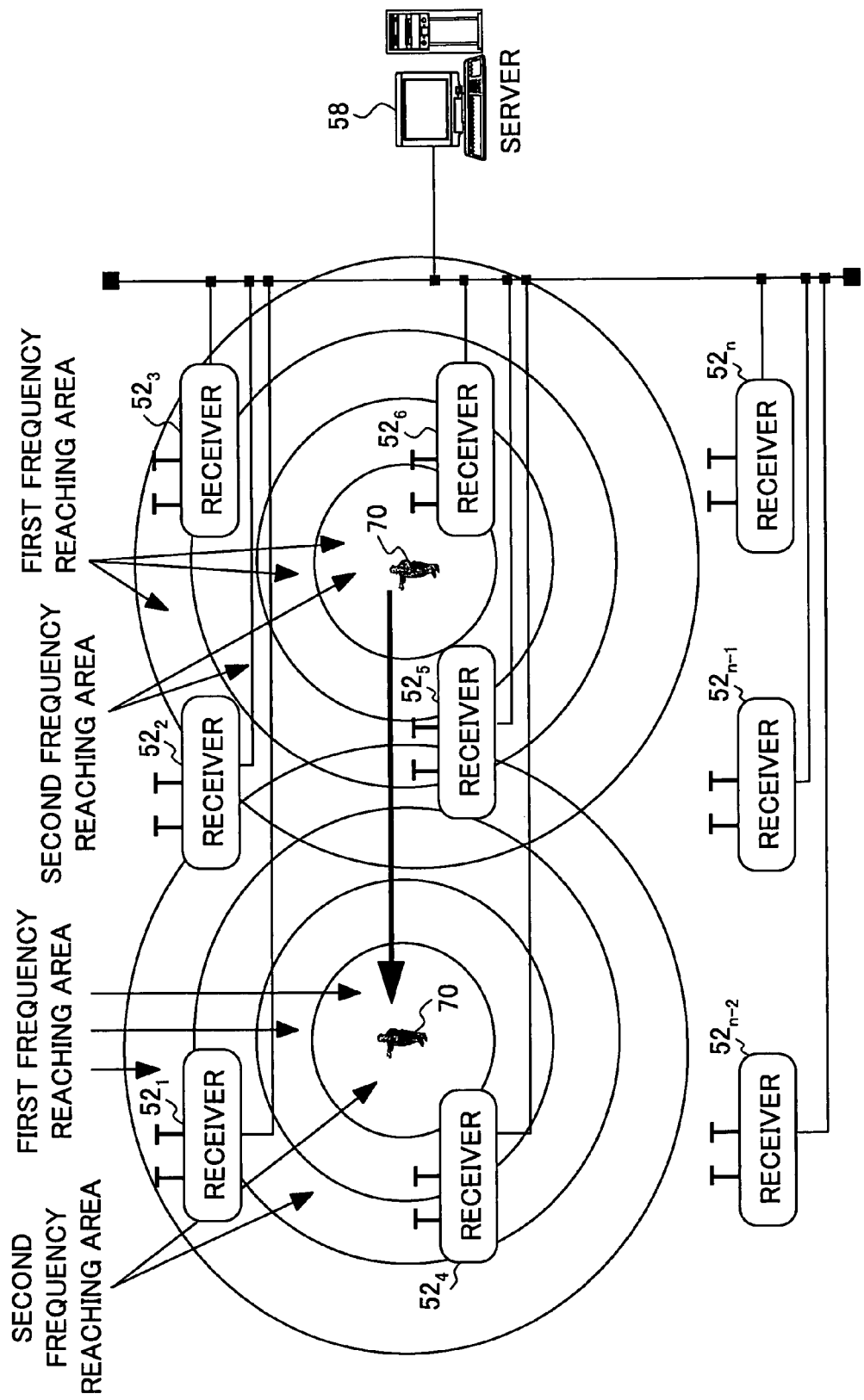
FIG. 14 is a view for explaining the second embodiment of the present invention.

Here, a case shown in FIG. 14 where plural receivers $52_1$ through $52_n$ are situated in a certain area and a person holding the active RFID terminal 54 moves from the position of the receiver $52_6$ to the position of the receiver $52_4$ is discussed. FIG. 14 is a view for explaining the second embodiment of the present invention.

Figure 15:
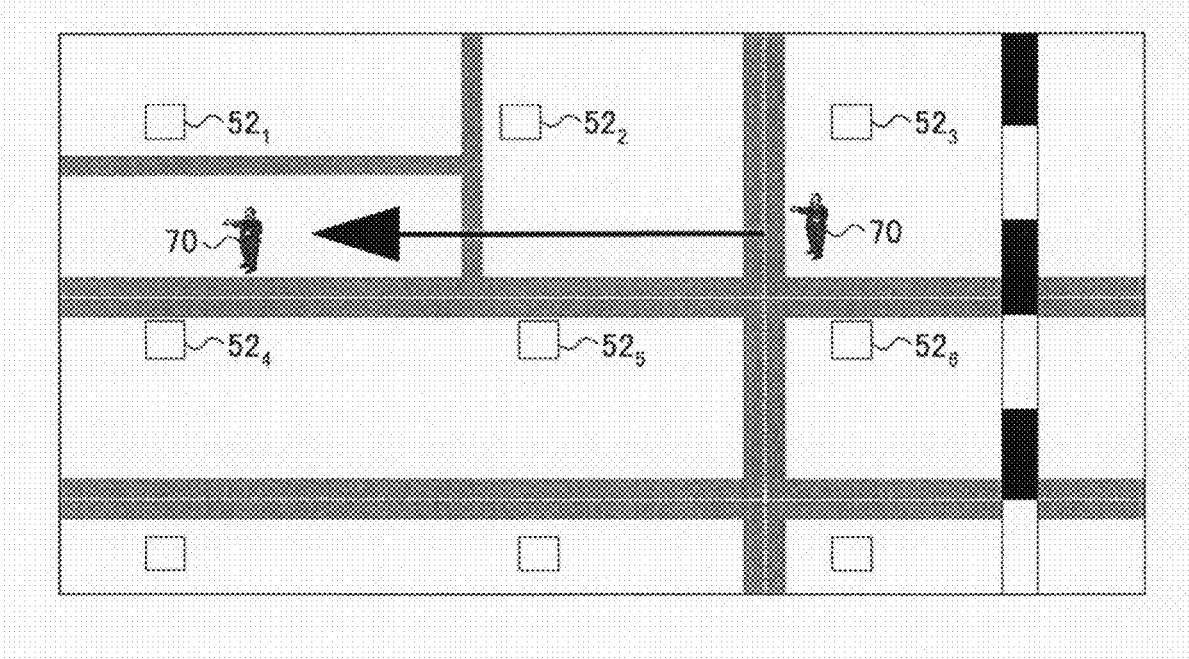
FIG. 15 is a view showing a display screen of the position detecting server 58.

(1) In the vicinity of the receiver $52_6$, the identification information signal of the first frequency from the active RFID terminal 54 is received by the receivers $52_2$ and $52_3$ and the identification information signal with the second frequency is received by the receivers $52_5$ and $52_6$. Because of this, as shown in FIG. 15, a person 70 holding the RFID terminal 54 is displayed near the receiver $52_6$ on the display screen of the position detecting server 38. Here, FIG. 15 is a view showing a display screen of the position detecting server 58;

(2) Next, if the person holding the RFID terminal 35 moves to a side of the receivers $52_5$, the identification information signal of the first frequency and the identification information signal of the second frequency are received by the receivers $52_2$ and $52_5$ situated in the receiving area of the frequencies. Because of this, the person 70 holding the RFID terminal 54 is displayed near the receiver $52_5$ on the display screen of the position detecting server 58.

(3) As the person 70 holding the RFID terminal 54 moves, the receiver receiving the identification information signal moves. Finally, the identification information signal of the first frequency is received by the receivers $52_1$, and $52_5$, and the identification information signal of the second frequency is received by only the receivers $52_4$. Because of this, the person 70 holding the RFID terminal 54 is displayed near the receiver $52_4$ on the display screen of the position detecting server 58.

Thus, it is possible to implement position detecting with high precision so that movement of the person 70 holding the RFID terminal 54 is displayed on the display screen of the position detecting server 58, smoothly and accurately.

Figure 16:
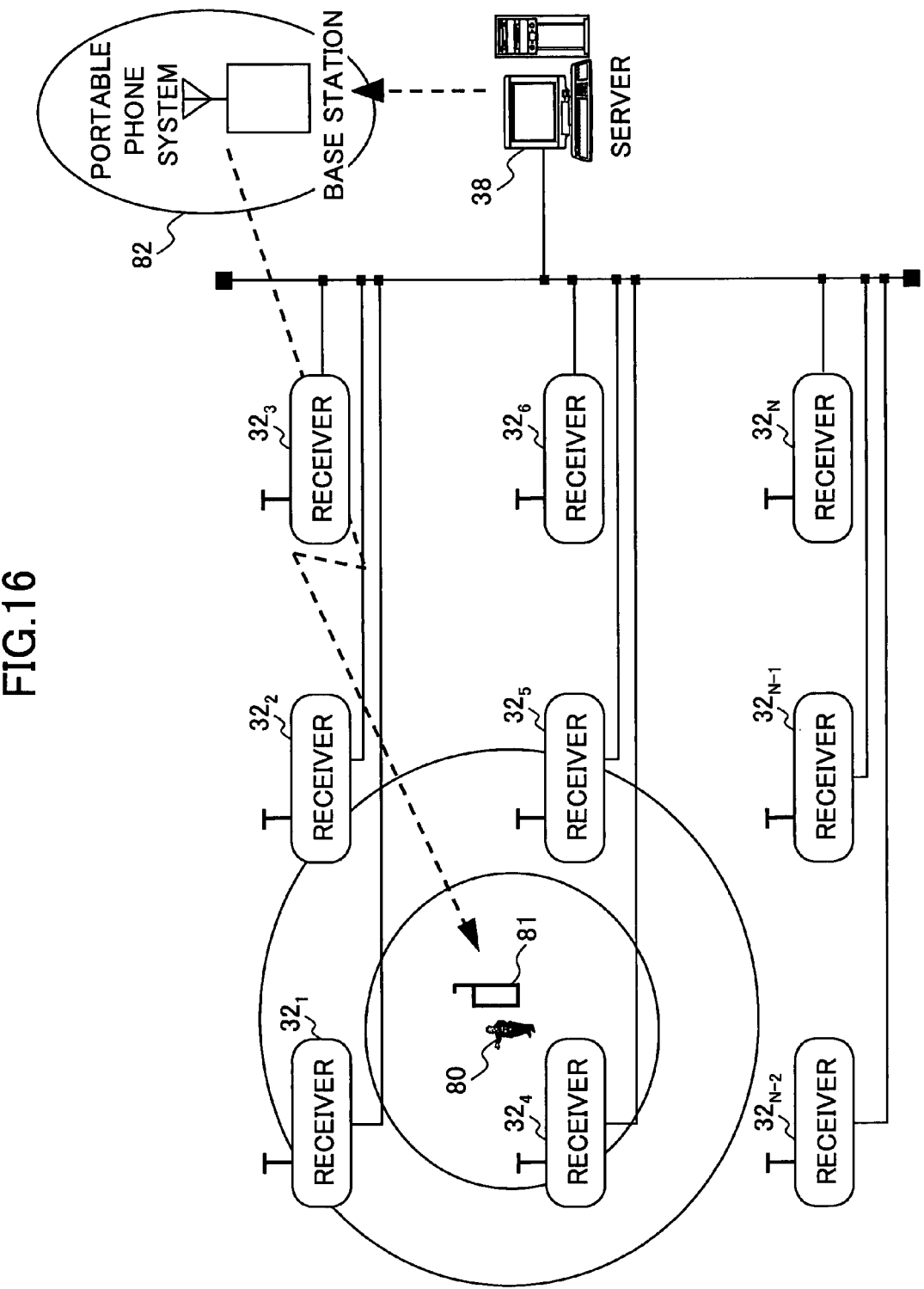
FIG. 16 is a schematic view showing an example where the first embodiment of the present invention is applied.
Figure 17:
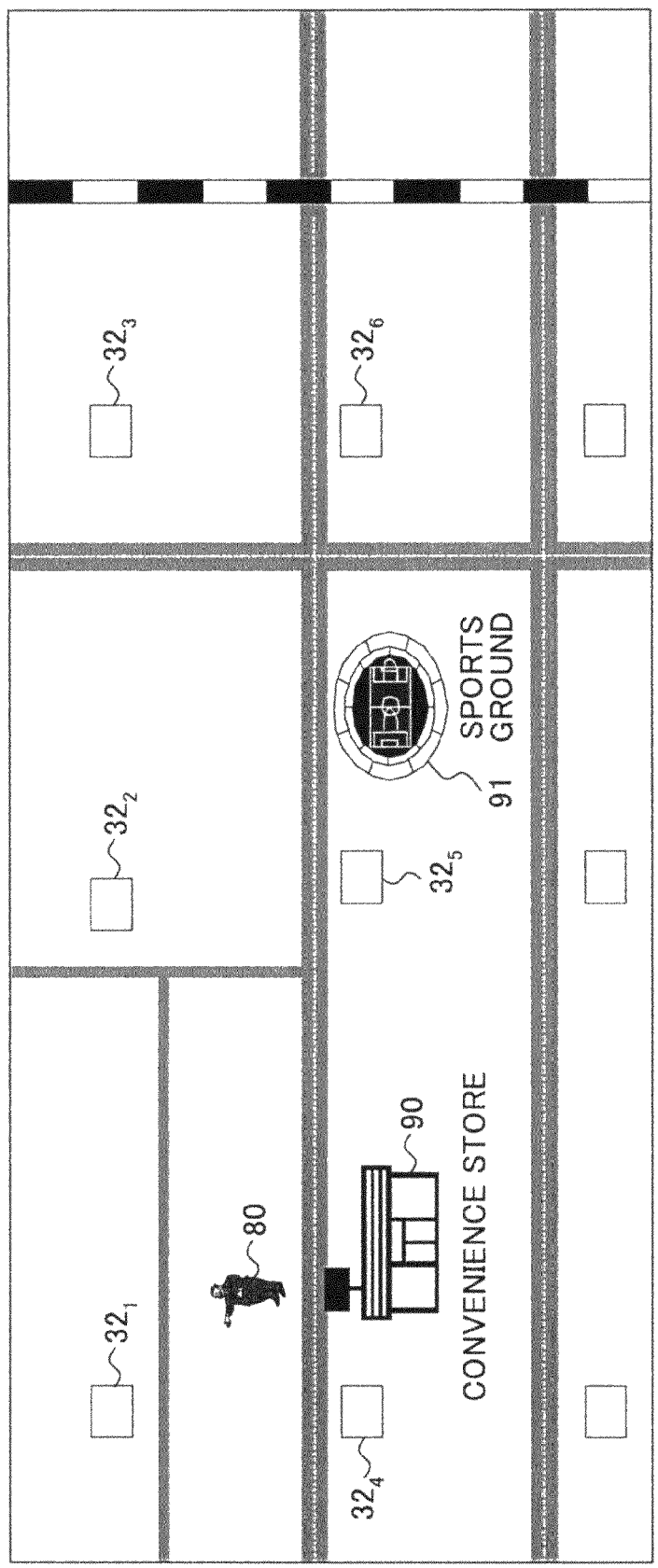
FIG. 17 is a view showing a display screen of the position detecting server 38.

In this embodiment, a time for outputting the identification information signal of the first frequency from the active the RFID terminal 54 is different from a timing for outputting the identification information signal of the second frequency from the active the RFID terminal 54. However, the present invention is not limited to this. The identification information signal of the first frequency and the identification information signal of the second frequency may be output concurrently.

An Example where the First Embodiment of the Present Invention is Applied FIG. 16 is a schematic view showing an example where the first embodiment of the present invention is applied. FIG. 17 is a view showing a display screen of the position detecting server 38. In this example, plural receivers $32_1$ through $32_n$ are situated in a certain area and a person holding the active RFID terminal 34 moves is discussed. In this example, a service is implemented where useful information about a store is automatically provided by portable e-mail when the person holding the active RFID terminal 34 passes in the vicinity of a store such as a convenient store 90 or a facility such as a sports ground.

(1) When the person 80 holding the RFID terminal 34 moves in the vicinity of the convenience store 90, the identification information signal transmitted from the active RFID terminal 34 is received by the receiver $32_1$, $32_4$ and $32_5$ situated in the vicinity of the RFID terminal 34, and the information is forwarded to the position detecting server 38.

(2) The position detecting server 38 specifies the position of the active RFID terminal 34 from the positions of the receiver $32_1$, $32_4$ and $32_5$ so as to search whether there is a store or facility near the active RFID terminal 34, the store or facility being registered in advance.

(3) In a case where there is a store or facility near the active RFID terminal 34, the store or facility being registered in advance, registered advertisement information (good buy information in a case of the convenience store) is sent to an e-mail address of a portable phone 81 of the person 80 holding the RFID terminal via the Internet.

The advertisement information sent via a portable phone system 82 is received by the portable phone 81 of the person 80 holding the RFID terminal so that the advertisement information can be known.

Thus, it is possible for the person 80 holding the RFID terminal 34 to have sent out the advertisement information registered in advance such as the shop or the facility in real time when passing in the vicinity of the store or facility.

As discussed above, in the first embodiment of the present invention, plural identification information signals having different radio strengths are output from the active RFID terminal. In the second embodiment of the present invention, plural identification information signals having different radio frequencies are output from the active RFID terminal. There embodiments may be integrated so that plural identification information signals having different radio strengths and frequencies are output from the active RFID terminal. In this case, a structure of the active RFID terminal is the same as that shown in FIG. 11.

The attenuator part 43 discussed above corresponds to an attenuation switching part of claims mentioned below. The RF part 63a discussed above corresponds to a first modulating part of claims mentioned blow. The RF part 63b discussed above corresponds to a second modulating part of claims mentioned blow. A selection part 62 discussed above corresponds to a selection part of claims mentioned blow.

The present invention can be applicable to a technical field, especially, requiring position information with high precision. For example, the present invention can be applied in various ways such as confirming a place in a building, confirming a lost child in a play facility, or searching for a person who has wandered away from an old people's home.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A position detecting system, comprising:
an RFID terminal configured to transmit an identification information signal by radio;
a plurality of receiving devices configured to receive the identification information signal; and
a position detecting server configured to receive a reception notification of the identification information signal from each of the receiving devices;
wherein the RFID terminal includes a part configured to perform radio transmission of a plurality of identification information signals having different radio strengths, at designated time intervals;
the receiving devices are configured to report, when receiving each identification information signal, the reception notification of the received identification information signal to the position detecting server; and
the position detecting server includes a part configured to calculate the center of gravity of positions of receiving devices reporting the reception notifications, of each time interval,
configured to determine that the RFID terminal has performed the radio transmission of a predetermined one of the identification information signals at a current time interval, depending on the number of receiving devices reporting the reception notifications of the predetermined identification information signal, and
configured to estimate a position of the RFID terminal based on a calculation result of the center of gravity of the current time interval where a weighting factor is applied and a calculation result of the center of gravity of a previous time interval.

2. A position detecting system, comprising:
an RFID terminal configured to transmit an identification information signal by radio;
a plurality of receiving devices configured to receive the identification information signal; and
a position detecting server configured to receive a reception notification of the identification information signal from each of the receiving devices;
wherein the RFID terminal includes a part configured to perform radio transmission of a plurality of identification information signals having different radio frequencies, at designated time intervals;
the receiving devices are configured to report, when receiving each identification information signal, the reception notification of the received identification information signal to the position detecting server; and
the position detecting server includes a part configured to calculate the center of gravity of positions of receiving devices reporting the reception notifications, of each time interval,
configured to determine that the RFID terminal has performed the radio transmission of a predetermined one of the identification information signals at a current time interval, depending on the number of receiving devices reporting the reception notifications of the predetermined identification information signal, and
configured to estimate a position of the RFID terminal based on a calculation result of the center of gravity of the current time interval where a weighting factor is applied and a calculation result of the center of gravity of a previous time interval.

3. A position detecting server of a position detecting system, in which position detecting system an identification information signal transferred by radio from an RFID terminal is received by a plurality of receivers, and a reception notification of the identification information signal from each of the receivers is received by the position detecting server, wherein the RFID terminal includes a part configured to perform radio transmission of a plurality of identification information signals having different radio strengths, at designated time intervals, and the receivers are configured to report, when receiving each identification information signal, the reception notification of the received identification information signal to the position detecting server, the position detecting server comprising:
  a part configured to calculate the center of gravity of positions of receiving devices reporting the reception notifications, of each time interval,
  configured to determine that the RFID terminal has performed the radio transmission of a predetermined one of the identification information signals at a current time interval, depending on the number of receivers reporting the reception notifications of the predetermined identification information signal, and
  configured to estimate a position of the RFID terminal based on a calculation result of the center of gravity of the current time interval where a weighting factor is applied and a calculation result of the center of gravity of a previous time interval.

4. The position detecting server as claimed in claim 3,
wherein, by the RFID terminal, ID information is coded, the coded ID information is modulated, attenuation to the identification information signal is switched; and
each of the receivers receives and decodes the identification information signal, and transmits the reception notification to the position detecting server.

5. The position detecting server as claimed in claim 3,
wherein the RFID terminal includes
a first modulating part configured to modulate coded ID information and output a first identification information signal having a relatively high radio strength,
a second modulating part configured to modulate the coded ID information and output a second identification information signal having a relatively low radio strength, and
a selecting part configured to select one of the first modulating part and the second modulating part so as to supply the coded ID information;
wherein the coded ID information from the RFID terminal is demodulated so that the first identification information signal or the second identification information signal is received.

6. A position detecting server of a position detecting system, in which position detecting system an identification information signal transferred by radio from an RFID terminal is received by a plurality of receivers, and a reception notification of the identification information signal from each of the receivers is received by the position detecting server, wherein the RFID terminal includes a part configured to perform radio transmission of a plurality of identification information signals having different frequencies, at designated time intervals, and the receivers are configured to report, when receiving each identification information signal, the reception notification of the received identification information signal to the position detecting server, the position detecting server comprising:
  a part configured to calculate the center of gravity of positions of receiving devices reporting the reception notifications, of each time interval,
  configured to determine that the RFID terminal has performed the radio transmission of a predetermined one of the identification information signals at a current time interval, depending on the number of receivers reporting the reception notifications of the predetermined identification information signal, and
  configured to estimate a position of the RFID terminal based on a calculation result of the center of gravity of the current time interval where a weighting factor is applied and a calculation result of the center of gravity of a previous time interval.

7. The position detecting server as claimed in claim 6,
wherein the RFID terminal includes
a first modulating part configured to modulate coded ID information and output a first frequency identification information signal,
a second modulating part configured to modulate the coded ID information and output a second frequency identification information signal, and
a selecting part configured to select one of the first modulating part and the second modulating part so as to supply the coded ID information;
wherein the coded ID information from the RFID terminal is demodulated so that the first frequency identification information signal or the second frequency identification information signal is received.

* * * * *